United States Patent [19]

Warner

[11] Patent Number: 5,425,544

[45] Date of Patent: Jun. 20, 1995

[54] BUSHINGLESS WORKHEAD

[75] Inventor: Jerry G. Warner, Slinger, Wis.

[73] Assignee: Giddings & Lewis, Inc., Fond du Lac, Wis.

[21] Appl. No.: 219,495

[22] Filed: Mar. 28, 1994

Related U.S. Application Data

[63] Continuation of Ser. No. 853,484, Mar. 18, 1992, Pat. No. 5,319,890.

[51] Int. Cl.⁶ .............................................. B23B 31/20
[52] U.S. Cl. ...................................... 279/4.09; 279/50
[58] Field of Search ........................... 279/4.07–4.09, 279/50; 451/375

[56] References Cited

U.S. PATENT DOCUMENTS

| | | |
|---|---|---|
| 2,120,198 | 6/1938 | Blazek et al. |
| 2,413,678 | 1/1947 | Beverlin .............................. 279/503 |
| 2,471,921 | 5/1949 | Ashdown . |
| 2,606,767 | 8/1952 | Preston . |
| 3,711,997 | 1/1973 | Kushigian . |
| 4,016,680 | 4/1977 | Moores, Jr. et al. |
| 4,032,162 | 6/1977 | Flinchbaugh . |
| 4,762,447 | 8/1988 | Marantette . |
| 4,791,841 | 12/1988 | Pruvot et al. |
| 4,867,463 | 9/1989 | Hopf . |

Primary Examiner—Steven C. Bishop
Attorney, Agent, or Firm—Foley & Lardner

[57] ABSTRACT

A bushingless workhead comprises a flexible drill collet inside a flexible chucking collet. The chucking collet has external frusto-conical surfaces on the ends thereof that mate with corresponding frusto-conical surfaces on a pair of pistons. The pistons are slidable within a housing away from each other to apply opposed forces to the chucking collet. The forces cause the chucking collet to collapse and to also collapse the drill collet to grip a tool inside the drill collet. One piston applies a greater force on the chucking collet than the other piston. The chucking collet is thus forced to move longitudinally in one direction, and it abuts a fixed reference surface that repeatably locates the chucking collet with each tool gripping operation prior to the chucking collet collapsing to grip the tool.

12 Claims, 4 Drawing Sheets

BUSHINGLESS WORKHEAD

This is a continuation of U.S. Ser. No. 07/853,484 filed on Mar. 18, 1992. Pat. No. 5,319,890.

BACKGROUND OF THE INVENTION

1. Field of the Invention

This invention pertains to clamping mechanisms, and more particularly to apparatus for releasably gripping cylindrical workpieces.

2. Description of the Prior Art

Various equipment has been developed to manufacture and resharpen cutting tools such as twist drills and end mills. Those types of tools are invariably chucked in the workhead of a tool grinding machine having multiple drive mechanisms that impart compound motions to the workhead to move the tool cutting edge along appropriate contact with a grinding wheel. An exemplary machine for grinding cutting points on twist drills is shown in U.S. patent application Ser. No. 513,080, now U.S. Pat. No. 5,125,186.

The workhead chuck plays a very important part in the tool grinding process. The chuck must firmly and accurately grip the tool for grinding and release it after the grinding operation is completed. Many prior chucks include a chucking collet that is a permanent part of the workhead and a series of drill collets that interchangeably fit inside the chucking collet. The chucking collet and drill collet define a common longitudinal axis that is concentric with the axis of rotation of the workhead. The tool fits inside the drill collet. A drill collet can accommodate a small range of tool diameters.

Both the chucking collet and the drill collet are normally designed as a series of longitudinally extending ribs that are joined together on alternate ends. Some chucking collets, called single angle collets, have a single ring of material around the exterior of the ribs. The ring is formed with a frusto-conical surface. A piston that is part of the chuck has an internal frusto-conical surface that mates with the frusto-conical surface of the chucking collet. By moving the piston longitudinally along the workhead axis, the chucking collet is caused to collapse onto the drill collet, which also collapses to grip the tool inside the drill collet. A fixed surface is usually provided in the workhead to locate the chucking collet during the tool chucking actions Such that the chucking collet does not move the tool longitudinally during chucking.

Single angle collets have the disadvantage of being able to effectively collapse only under the ring with the frusto-conical surface. To provide stability to the tool about a transverse axis, a drill bushing is installed into and accurately located within the workhead concentric with the chucking and drill collets. One portion of the tool is accurately located within the drill bushing while another portion of the tool is clamped by the drill collet. An example of a single angle collet-drill bushing combination may be seen in FIG. 13 of U.S. Pat. No. 4,365,444.

Another drawback of the single angle collet-drill bushing design is that a different drill bushing is required for each diameter tool. Up to 250 drill bushings are required for standard inch and popular metric sized drills within the diameter range of 2.3 to 25.4 millimeters. Manufacturing multiple drill bushings and replacing worn drill bushings is expensive. Further, changing drill bushings with each change in diameter of the tool to be ground is a time consuming process. The combination single angle collet and drill bushing chucks also occupy an undesirably large volume of space.

To enable tools to be rigidly chucked without requiring a different drill bushing for each diameter tool, it is known to employ double angle collets. Such collets are generally similar to single angle collets, but they are usually longer and have two frusto-conical surfaces on their exteriors. The apexes of the two frusto-conical surfaces point away from each other. A pair of pistons within the workhead have frusto-conical surfaces that mate with the respective frusto-conical surfaces of the collet. Actuating the pistons longitudinally toward each other against the two collet frusto-conical surfaces collapses the double angle collet. A drill collet inside the double angle collet is also collapsed to grip a tool inside the drill collet. Because the two frusto-conical surfaces can be spread relatively far apart and thus grip a tool at relatively widely spaced locations, the double angle collet provides rotational rigidity to the tool without the use of drill bushings. An offsetting drawback, however, of prior double angle collets is that they cannot be longitudinally located against a reference surface. The double angle collet, together with the drill collet and the tool being gripped, move longitudinally during the chucking process a distance proportional to the amount of collapse required to grip the tool. After every chucking, therefore, the workhead and tool must undergo a preliminary search routine to reference the location of the tool point in space before grinding can begin. The tool referencing routine represents unproductive time.

Thus, a need exists for improvements in tool chucks.

SUMMARY OF THE INVENTION

In accordance with the present invention, a bushingless workhead is provided that accurately and rigidly chucks cylindrical workpieces without the use of bushings. This is accomplished by apparatus that includes a chucking collet that is repeatably locatable every time the bushingless workhead chucks a tool.

The chucking collet is manufactured as a series of longitudinally extending ribs that define a longitudinal axis and that are joined at alternate ends. The external surface of the ribs are formed with front and back frusto-conical surfaces whose apexes point toward each other. Preferably, the two frusto-conical surfaces are located at the two ends of the chucking collet with a generally cylindrical surface extending between them.

The chucking collet of the present invention is held radially and axially in place in the bushingless workhead by two pistons that are concentric with the chucking collet longitudinal axis and concentric with the axis of rotation of the bushingless workhead. A primary piston has an internal cylindrical surface that is slidable along the central cylindrical surface of the chucking collet. The primary piston also has a frusto-conical surface that mates with the back frusto-conical surface of the chucking collet. The primary piston has an outer diameter that is slidable inside a rotary piston housing. A secondary piston has an internal diameter that is slidable along the central cylindrical surface of the chucking collet and a frusto-conical surface that mates with the front frusto-conical surface of the chucking collet. The secondary piston outer diameter slides within the rotary piston housing. A hydraulic port leads to a fluid chamber between the two pistons.

The bushingless workhead is actuated by introducing pressurized fluid to the chamber. The fluid forces the two pistons longitudinally away from each other. The frusto-conical surfaces on the two pistons bear against the respective frusto-conical surfaces of the chucking collet to collapse it and a drill collet inside the chucking collet to grip a tool in the drill collet.

The primary piston presents a greater area to the fluid chamber than the secondary piston. Consequently, when pressure is introduced into the fluid chamber, the differential area of the two pistons causes the primary piston to force the chucking collet to move longitudinally in one direction. Such movement of the chucking collet is limited by a collet retainer installed in the piston housing. The collet retainer serves as a reference location for the chucking collet, and the chucking collet repeatably returns to the reference location every time the bushingless workhead is actuated. Only after the chucking collet is located against the collet retainer does the chucking collet collapse to collapse the drill collet and grip the tool. Consequently, the tool does not move longitudinally during the chucking process.

Further in accordance with the present invention, the chucking collet is much more flexible and is Capable of collapsing a greater amount than prior chucking collets. Flexibility is achieved by fabricating the chucking collet with a large number of ribs with necks that flexibly interconnect alternate ends of the ribs. The flexibility of the chucking collet enables it to be pushed into assembly inside the primary and secondary pistons and held thereby its front and back frusto-conical surfaces.

The drill collets used with the bushingless workhead, like the chucking collet, are far more flexible than prior drill collets. The drill collets are thus capable of accommodating a wider range of tool diameters than prior drill collets. For a common range of tool diameters, up to 40 percent fewer drill collets are required with the present invention than with prior chucking collets and drill collets.

To locate and retain a drill collet in the chucking collet, each drill collet has an annular flange that abuts an end of the chucking collet adjacent the collet retainer. Two small pins extend from the collet retainer radially toward the bushingless workhead axis. A small cutout in the drill collet flange enables the flange to pass past the pins and contact the end of the chucking collet. Then a slight rotation of the drill collet captures the flange between the chucking collet and the collet retainer pins with a small amount of clearance therebetween.

Other advantages, benefits, and features of the invention will become apparent to those skilled in the art upon reading the detailed disclosure of the invention.

BRIEF DESCRIPTION OF THE DRAWINGS

FIG. 3 is a side view of FIG. 1.

FIG. 6 is a cross sectional view taken along line 6 of FIG. 4.

DETAILED DESCRIPTION OF THE PREFERRED EMBODIMENT

Figure 1:
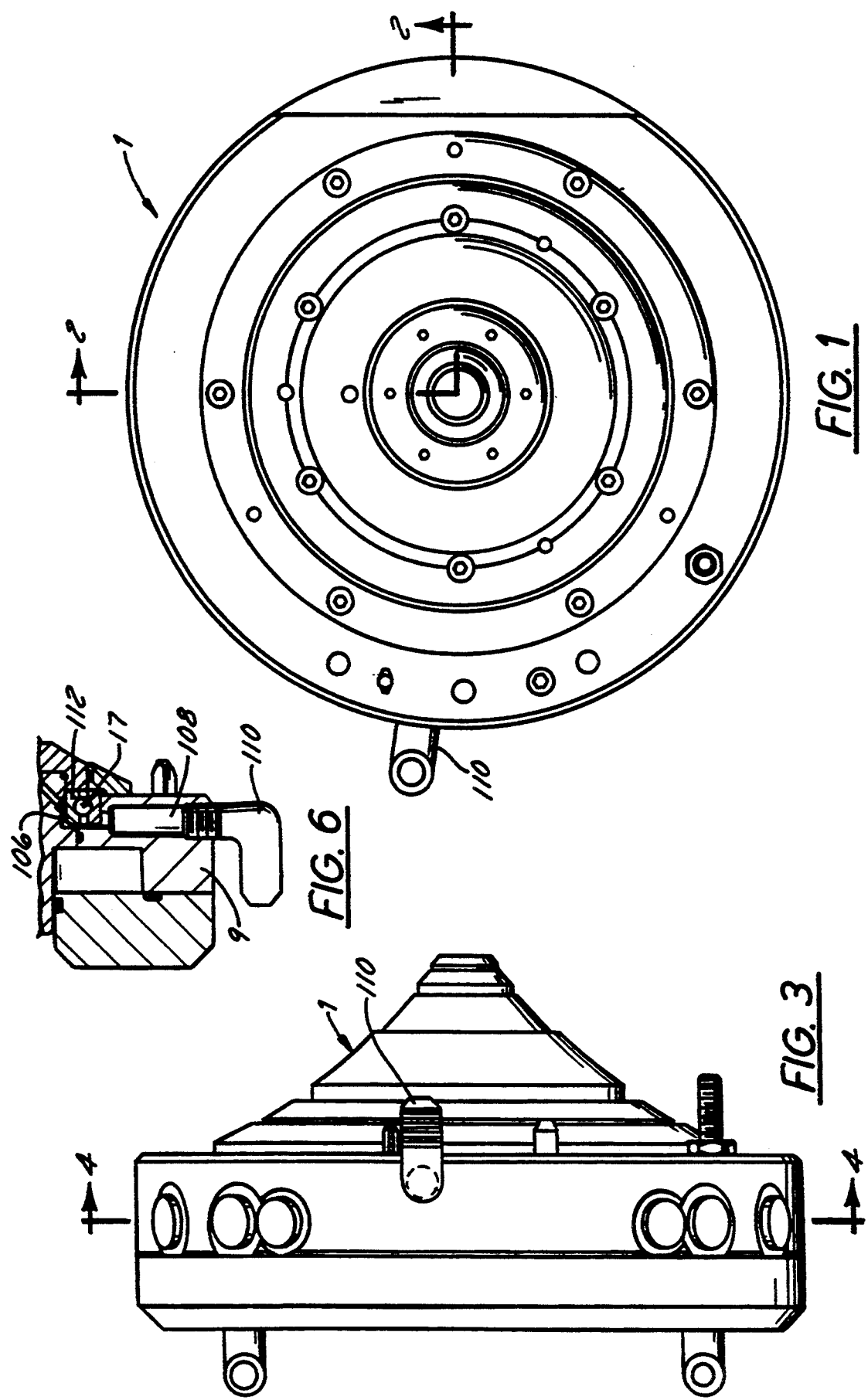
FIG. 1 is a front view of the bushingless workhead of the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1-6, a bushingless workhead 1 is illustrated that includes the present invention. The bushingless workhead is particularly useful for chucking drills in order to grind the cutting edges 5 thereof, but it will be understood that the invention is not limited to tool manufacturing applications. The bushingless workhead 1 is shown in the environment of a drill web splitting machine 7. In that type of machine, the web of a drill 3 is thinned by properly grinding the cutting edge 5 on a grinding wheel 8, as is known in the art. For convenience, the side of the bushingless workhead 1 opposite the grinding wheel 8 will be called the back side B of the workhead, and the workhead side on the same side as the grinding wheel will be called the front side F.

The bushingless workhead 1 comprises an annular body 9 supported by known structure to a machine base, not shown. Known mechanisms are operable to impart compound motions to the workhead body 9. A piston housing 13 is mounted, as by a four-point bearing 17 and retainers 18 and 22, to the workhead body 9 for oscillation about a central longitudinal axis 15. A vane cover 11 is fixedly attached to the workhead body 9. The workhead body, vane cover 11, and a hub portion 19 of the piston housing 13 cooperate to form an annular chamber 21. A pair of stops 23 and 25 are located in the annular chamber 21 and are fastened to the workhead body by screws 27. The stops 23 and 25 have respective radial stop surfaces 29 and 31. A vane 33 is also located in the annular chamber and is attached to the piston housing 13 by a pair of screws 35. The vane 33 has opposed stop surfaces 37 and 39 symmetrically located about a vane radial centerline 41. The stops 23 and 25 and the vane 33 are so located within the annular chamber that the vane, and thus the piston housing 13, is capable of oscillating through 180 degrees about the axis 15. That limit of oscillation is set in one direction by the vane surface 37 contacting the surface 31 of the stop 25, and in the other direction by the vane surface 39 contacting the surface 29 of the stop 23.

To oscillate the piston housing 13, oil is introduced into the annular chamber 21 through ports 43 and 45 and respective fittings 47 and 49. If oil is introduced through fitting 47 and port 43, the piston housing will rotate counterclockwise with respect to FIG. 4 until the vane surface 37 contacts the surface 31 of the stop 25. In that situation, port 45 and fitting 49 act as a return line. To rotate the piston housing clockwise with respect to FIG. 4, the oil pressure is reversed; oil under pressure enters the chamber 21 through the port 45 and fitting 49, and the return oil flows through port 43 and fitting 45. Any oil leakage past the stops drains out a drain port 44 and fitting 46. The oscillation of the piston housing 13 about the axis 15 occurs simultaneously with the compound motions of the workhead body 9.

In accordance with the present invention, the bushingless workhead 1 rigidly chucks drills 3 without the use of drill bushings and without moving the drills longitudinally during the chucking process. The drills are gripped in appropriate drill collets 47, to be described presently. In turn, the drill collets 47 are interchangeably retained in a chucking collet 49. The chucking collet 49 forms a permanent part of the bushingless workhead.

Figure 7:
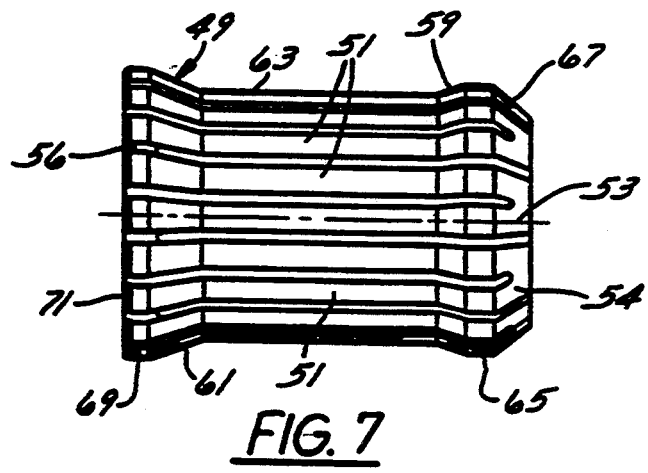
FIG. 7 is a side view on an enlarged scale of the chucking collet of the present invention.
Figure 9:
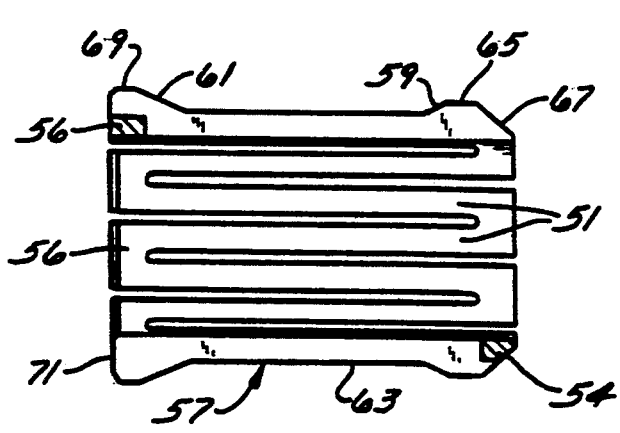
FIG. 9 is a cross sectional view taken along line 9 of FIG. 8.
Figure 8:
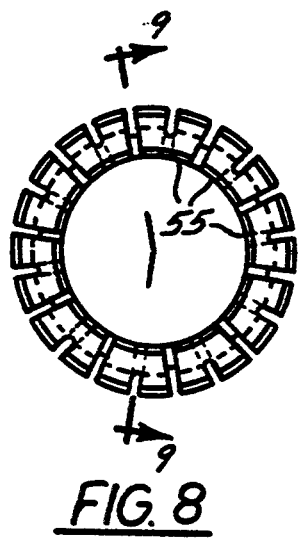
FIG. 8 is a front view of FIG. 7.

Turning to FIGS. 7-9, the chucking collet 49 is formed as a series of ribs 51 that extend longitudinally along a longitudinal axis 53. The chucking collet is generally-tubular shaped. The ribs 51 have generally rectangular cross sections of relatively small areas. The front ends of alternate ribs are joined by short necks 54, and the back ends of alternate ribs are joined by similar short necks 56. The necks 54 and 56 have relatively small cross sectional areas. The relatively small cross sections of the necks result in a chucking collet that is capable of collapsing toward the axis 53 with great flexibility.

The ribs 51 of the chucking collet 49 have respective straight internal surfaces 55 for their full lengths. The internal surfaces 55 cooperate to form a generally cylindrical internal surface about the axis 53. The external surfaces 57 of the ribs are contoured to include a front frusto-conical surface 59 and a back frusto-conical surface 61. The front and back frusto-conical surfaces 59 and 61, respectively, are separated by a central external cylindrical surface 63. The apexes of the two frusto-conical surfaces 59 and 61 point toward each other. The base end of the front frusto-conical surface terminates in a front cylindrical surface 65. A third frusto-conical surface 67 forms the front end of the chucking collet. The apexes of the front frusto-conical surface and third frusto-conical surface 67 point away from each other. The base end of the back frusto-conical surface terminates in a back cylindrical surface 69. Preferably, the diameter of the back cylindrical surface 69 is greater than the diameter of the front cylindrical surface 65. The back end of the chucking collet is a flat surface 71 that is perpendicular to the longitudinal axis 53.

Figure 2:
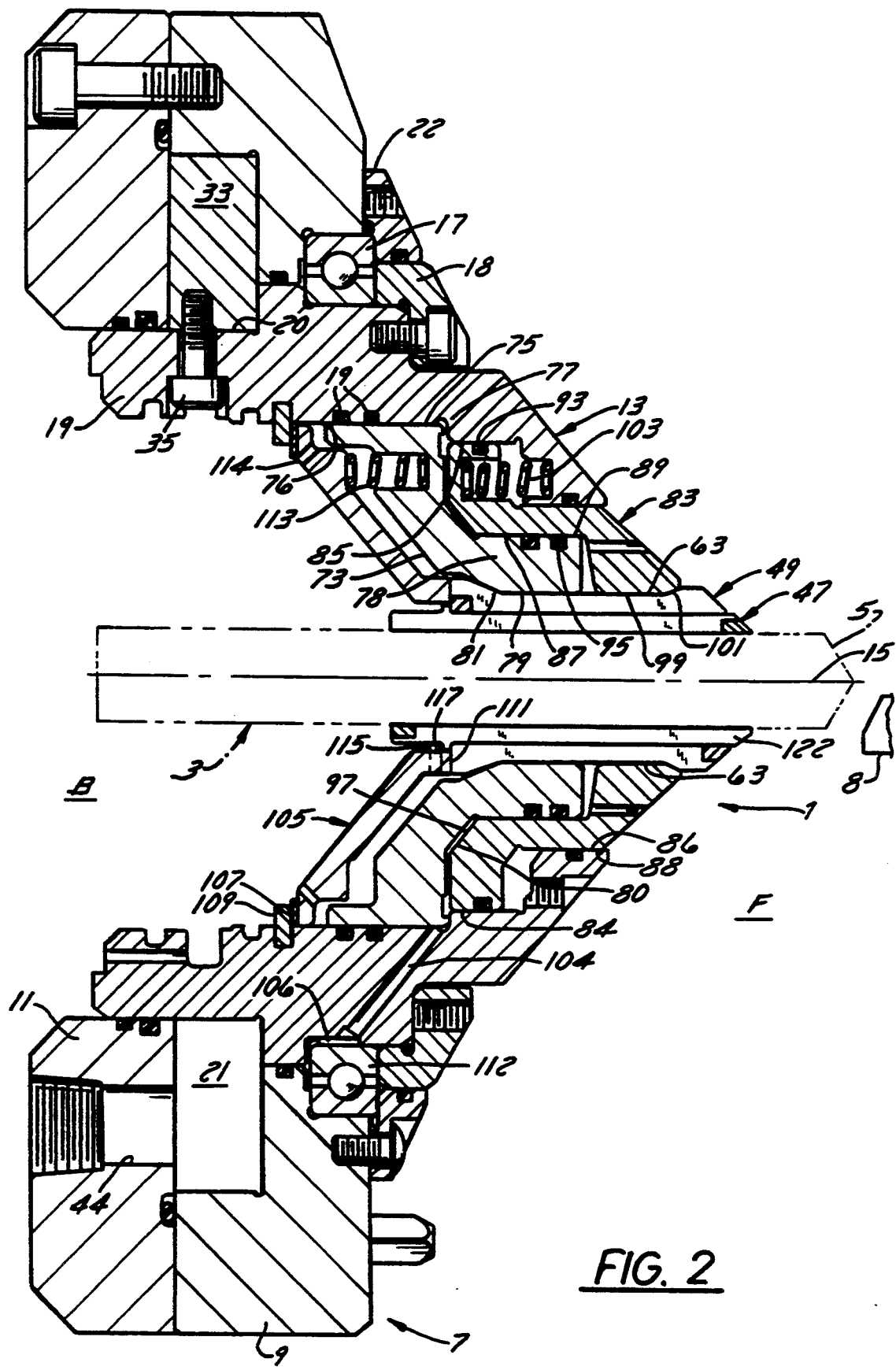
FIG. 2 is an enlarged cross sectional view taken along line 2 of FIG. 1.
Figure 4:
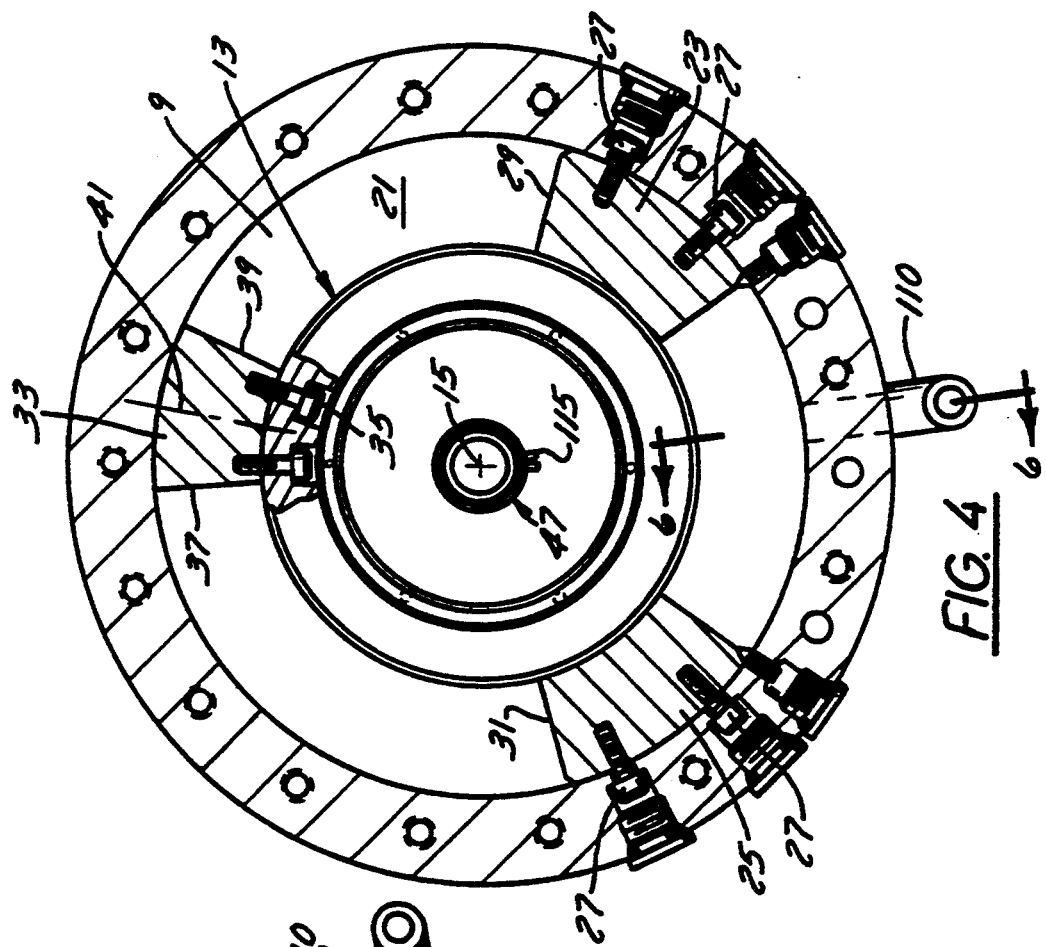
FIG. 4 is a cross sectional view taken along line 4 of FIG. 3 and rotated 90 degrees clockwise.
Figure 5:
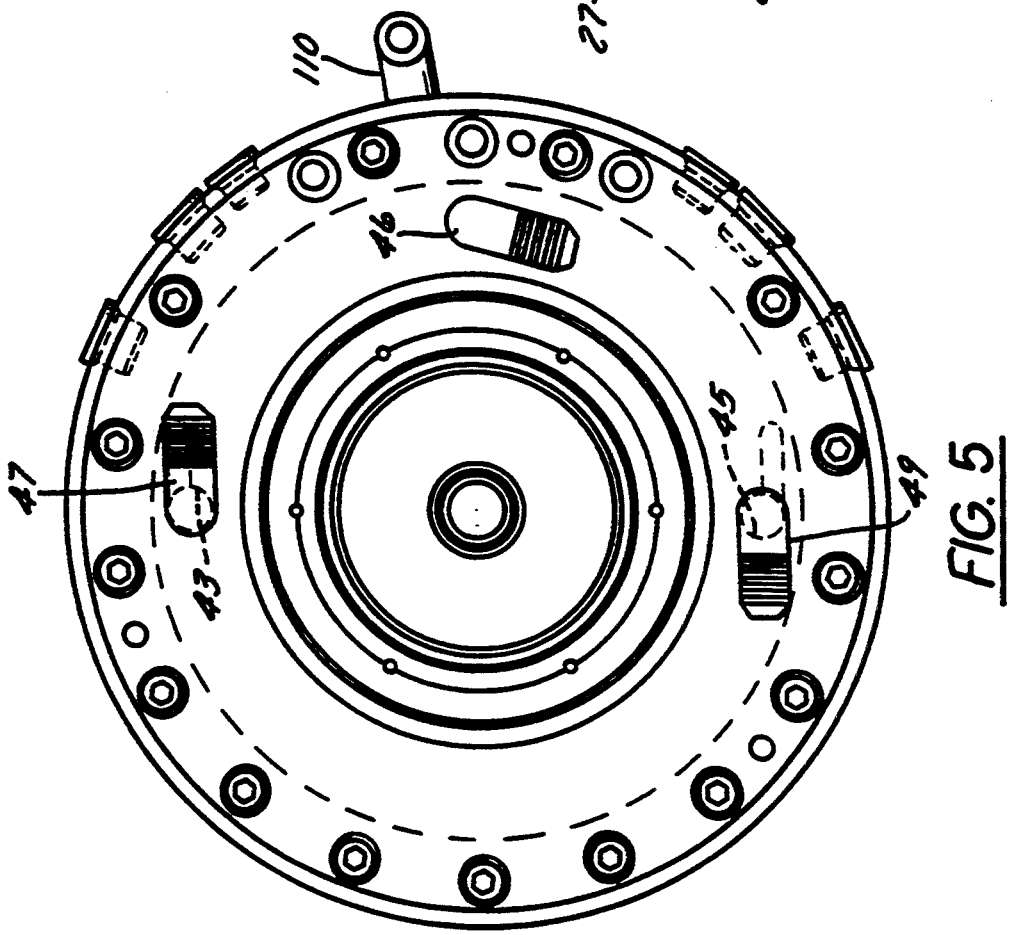
FIG. 5 is a back view of FIG. 1.

The chucking collet 49 is held within the bushingless workhead 1 by a pair of pistons that are slidably received in the piston housing 13, FIG. 2. A primary piston 73 has a first outer diameter 75 that slidably fits within a corresponding bore 76 in the piston housing. Sliding motion of the primary piston 73 toward the front side F of the bushingless workhead, that is, to the right with respect to FIG. 2, is limited by a front face 80 of the primary piston striking a shoulder 77 of the piston housing. The primary piston has a hub 78 with an inner diameter 79 and a second outer diameter 89. The inner diameter 79 of the hub 78 slidingly fits over the central cylindrical surface 63 of the chucking collet. A frusto-conical surface 81 on the primary piston mates with the back frusto-conical surface 61 on the chucking collet.

A secondary piston 83 has a first outer diameter 84 that slides within a bore 85 in the piston housing 13 and a second outer diameter 88 that slides within a bore 86 of the piston housing. The piston housing bore 85 has a lesser diameter than the piston housing bore 76. The secondary piston 83 has an inner diameter 87 that is slidable over an outer diameter 89 of the primary piston hub 78. The secondary piston also has an inner diameter 99 that slidingly fits over the central cylindrical surface 63 of the chucking collet 49 and a frusto-conical surface 101 that mates with the front frusto-conical surface 59 of the chucking collet. A number of angularly spaced compression springs 103 act between the piston housing and the secondary piston to urge the secondary piston toward the back side B of the bushingless workhead 1.

It will be noticed that the inner diameter 79 and frusto-conical surface 81 of the primary piston 73, and the inner diameter 99 and frusto-conical surface 101 of the secondary piston 83, lie between the front and back frusto-conical surfaces 59 and 61, respectively, of the chucking collet 49. Nevertheless, the chucking collet is assemblable inside the two pistons. Assembly is achieved by pushing the third frusto-conical surface 67 of the chucking collet longitudinally against the frusto-conical surface 81 of the primary piston. That action causes the chucking collet to collapse such that the chucking collet front cylindrical surface 65 fits inside the inner diameters 79 and 99 of the primary and secondary pistons, respectively. The chucking collet can thus be pushed inside the two pistons until the chucking collet back frusto-conical surface 61 contacts the primary piston frusto-conical surface 81. The great flexibility of the chucking collet, which is the result of the large number of ribs 51 and relatively flexible necks 54 and 56, enables the chucking collet to be assembled inside the two pistons with ease. The larger diameter of the chucking collet back cylindrical surface 69 relative to the front cylindrical surface 65 prevents the chucking collet from being easily pushed all the way through the two pistons. The frusto-conical surfaces of the chucking collet and of the two pistons locate and hold the chucking collet in place. When assembled, the chucking collet is capable of small amounts of longitudinal movement between the two pistons.

To provide a reference location for the chucking collet 49 inside the bushingless workhead 1 while chucking a drill 3, a collet retainer 105 is installed in the piston housing 13. A shim 107 is interposed between the back surface 114 of the collet retainer 105 and a snap ring 109 or similar shoulder formed in the piston housing. The shim 107 enables the longitudinal clearance of the chucking collet inside the primary and secondary pistons 73 and 83, respectively, to be accurately controlled.

The collet retainer 105 also has a front surface 11. The collet retainer front surface 111 is designed to abut the back surface 71 of the chucking collet 49. The relatively large diameter of the chucking collet back cylindrical surface 69 provides adequate bearing area between the chucking collet back surface 71 and the collet retainer front surface. In that manner, the longitudinal movement of the chucking collet in the backward direction, i.e., to the left with respect to FIG. 2, is repeatably limited by the fixed surface 111. A number of compression springs 113 are inserted between the primary piston 73 and the collet retainer 105 at angularly spaced intervals.

Two small pins 115 are pressed into the collet retainer 105 parallel to the front surface 111 thereof. The pins 115 are spaced at a known distance from the collet retainer surface 111. The pins 115 have respective free ends 117 that are located radially from the axis 15 of the bushingless workhead 1 a distance that is slightly greater than the distance of the internal surface 55 of the chucking collet 49 from chucking collet axis 53.

Seals 91 in the piston housing bore 76, seal 93 in the secondary piston outer diameter 84, and seals 95 in the outer diameter 87 of the primary piston hub 78 cooperate to form a fluid chamber 97. In the illustrated construction, fluid is supplied to the chamber 97 through one or more passages 104 in the piston housing 13. The passages 104 extend between the chamber 97 and associated recesses 106 in the piston housing 13 adjacent the inner race 112 of the bearing 17. The recesses 106 match with another passage 108 in the workhead body 9, FIG. 6. A fitting 110 installed in the workhead body 9 connect the passage 108 with a conventional source of pressurized fluid, not shown.

Figure 10:
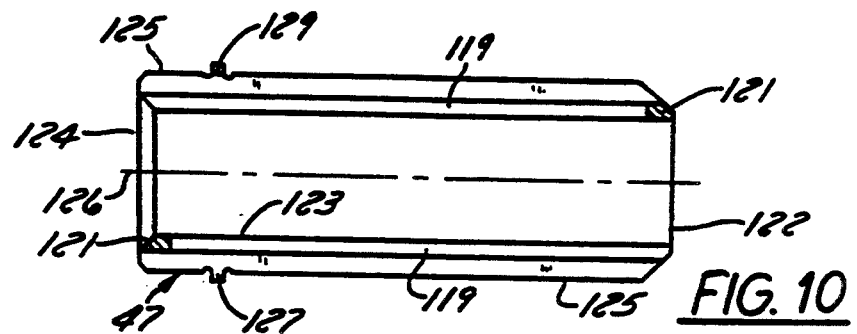
FIG. 10 is a longitudinal cross sectional view on an enlargened scale of a drill collet according to the present invention.
Figure 11:
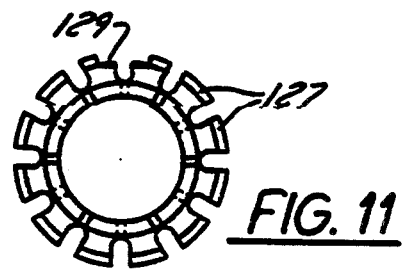
FIG. 11 is a back view of FIG. 10.

With reference to FIGS. 10 and 11, the drill collet 47 of the present invention has a number of longitudinally extending ribs 119. The ends of the ribs 119 are connected by alternate short necks 121 to create a generally tubular drill collet having front and back ends 122 and 124, respectively, and a longitudinal axis 126. The drill collet has generally cylindrical inner and outer peripheries 123 and 125, respectively. Near the back end 124 of the drill collet is formed a flange 127 on the outer peripheries 125 of the respective ribs. The width of the flange 127 is slightly less than the distance between the pins 115 in the collet retainer 105 and the back surface 71 of the collet chuck 47 (FIG. 2). The drill collet flange 127 does not extend completely around the outer periphery 125. Rather, the flange is omitted from portions of one or two of the ribs so as to form a cutout 129. The cutout 129 is large enough to enable the pins in the collet retainer to pass through the cutout.

A series of drill collets 47 is used with the bushingless workhead 1. All the drill collets have the same diameter for the outer peripheries 125. However, the drill collets have different diameters for the inner peripheries 123. Each inner periphery is designed to accept a range of diameters of drills 3. The number and cross sectional shapes of the ribs 119 of each drill collet are functions of the drill sizes to be gripped in that drill collet. In each case, the number of ribs, and thus the number of necks 121, is maximized. The necks are designed to deflect relatively large amounts such that the drill collets can be collapsed with great flexibility toward the longitudinal 126. Because of the great flexibility of the collet chuck 49 and the drill chuck 47, a smaller number of drill collets is required to handle a given range of drill diameters than with prior grinding equipment workheads. For example, with prior equipment approximately 57 drill collets are required to handle drills with a diameter range of 2.3 millimeters to 25.4 millimeters. With the present invention, on the other hand, only approximately 35 drill collets are required to accommodate the same range of drill diameters. It will be appreciated, of course, that the present invention is fully capable of handling drills and other tools having diameters greater than 25.4 millimeters.

To use the bushingless workhead 1, pressure in the chamber 97 is initially released. The springs 113 urge the primary piston 73 against the shoulder 77 of the piston housing 13. The springs 103 press the secondary piston 83 against the front face 80 of the primary piston. In that situation, there is no force exerted by the primary piston frusto-conical surface 81 on the chucking collet back frusto-conical surface 61, nor by the secondary piston frusto-conical surface 101 on the chucking collet front frusto-conical surface 59. The chucking collet is then capable of small amounts of longitudinal movement between the two pairs of mating frusto-conical surfaces.

The machine operator selects the proper drill collet 47 for the particular drill 3 that is to be ground. He inserts the drill collet inside the chucking collet 49 from the back side B of the bushingless workhead 1. He aligns the cutout 129 of the drill collet flange 127 with the pins 115 in the collet retainer 105 so he can push the drill collet flange against the back surface 71 of the chucking collet. He then rotates the drill collet a few degrees until a portion of the flange is captured between the back end of the chucking collet and the collet retainer pins.

The operator next inserts the drill 3 from the back side B of the bushingless workhead 1 into the drill collet 47. The drill is initially located in the drill collet such that the cutting edge 5 extends from the drill collet front end 122 a distance approximately equal to the diameter of the drill. The drill is then timed in known manner by locating the cutting edge against a timing pad, not illustrated in the drawings, located near the grinding wheel 8. With the operator lightly holding the drill point against the timing pad, he actuates suitable controls to apply hydraulic pressure to the chamber 97, Consequently, the primary piston 73 is initially forced backwardly against the springs 113 toward the collet retainer 105. The primary piston frusto-conical surface 81 bears against the chucking collet frusto-conical surface 61 and forces the chucking collet 49 backwardly until the back surface 71 thereof contacts the collet retainer 105. At that point, the chucking collet is located at the reference location against the fixed surface 111. Further pressure buildup in the chamber 97 causes the frusto-conical surface 81 of the primary piston 73 to bear against the associated frusto-conical surface 61 of the chucking collet to collapse the back end of the Chucking collet 49. The collapsing chucking collet collapses the back end 124 of the drill collet 47 to grip the drill 3. Simultaneously, the secondary piston 83 is forced forwardly against the springs 103. The frusto-conical surface 101 of the secondary piston 83 is forced against the front frusto-conical surface 59 of the chucking collet and thereby collapses the front end thereof and also the front end 122 of the drill collet. Because of the differential area of the fluid chamber between the primary piston 73 and the secondary piston 83, the primary piston frusto-conical surface 81 bears against the chucking collet back frusto-conical surface 61 with more force than the secondary piston frusto-conical surface 101 bears against the chucking collet frusto-conical surface 59. Consequently, the primary piston consistently holds the chucking collet in place against the fixed surface 111 of the collet retainer during the chucking process.

The great advantage of the present invention-is that the drill 3 is not moved longitudinally by the chucking collet 49 or drill collet 47 relative to the timing pad during the chucking operation. As explained, that is because the differential area of the fluid chamber 97 on the pistons 73 and 83 causes the chucking collet to be located at a repeatable reference location before gripping of the drill occurs. Consequently, the operator can just lightly hold the drill cutting edge 5 against the timing pad until chucking is complete. The drill is then ready to be ground immediately, and the heretofore necessary steps of referencing the location in space of the drill cutting edge after chucking is eliminated.

When full pressure is present in the fluid chamber 97 and full gripping force is applied to the drill 3, suitable controls are actuated to move the bushingless workhead 1 to bring the tool cutting edge 5 into contact with the grinding wheel 8. Oil is introduced alternately to the fittings and ports 43, 47 and 45, 49 to oscillate the piston housing 13 about the workhead axis 15. Simultaneously, the bushingless workhead 1 and drill undergo compound motions in space. The motions are chosen to cause the drill cutting edge 5 to contact and move along the grinding wheel 8 in a manner that thins the drill web or grinds another desired profile on the cutting edge, as is known in the art.

When grinding is completed on the drill 3, the machine controls actuate to move the drill cutting edge 5 away from the grinding wheel 8 and to release the pressure in the fluid chamber 97. The springs 103 and 113 push the primary piston 73 and secondary piston 83 toward each other and away from the frusto-conical surfaces 59 and 61 of the chucking collet. The chucking collet 49 and drill collet 47 then relax to their uncollapsed configurations to enable the operator to pull the finished drill from the drill collet. The fact that the flange 127 of the drill collet is captured between the collet retainer pins 115 and the back surface 71 of the chucking collet assures that the drill collet will not pull out of the chucking collet when the operator pulls the drill from the drill collet. The operator then inserts a new drill into the bushingless workhead 1, and the cycle is repeated.

If the new drill 3 has a diameter that is different than the diameter of the previous drill but is within the range of the drill collet 47, no change in drill collet is necessary. Significantly, since no drill bushings are required in the bushingless workhead 1, no change in drill bushing is required to suit the new size drill. If the new drill has a diameter that is out of the range of the previously used drill collet, that drill collet is removed from the chucking collet 49. Removal is accomplished by manually rotating the drill collet until its flange cutout 129 is aligned with the collet retainer pin 115. The drill collet is then pulled toward the back B of the bushingless workhead and out of the chucking collet. Then the correct size drill collet can be inserted into the chucking collet.

The bushingless workhead 1 of the present invention eliminates drill bushings while simultaneously chucking drills 3 with rigidity and repeatability. In addition, the number of drill collets 47 required for a particular range of drill diameters is reduced by almost 40 percent compared with prior designs. The drills are rigidly supported in the bushingless workhead, yet the differential piston arrangement enables the workhead to have an exceptionally compact design. An advantage related to the compact design of the bushingless workhead is that drills having lengths as short as approximately 63 millimeters can be properly chucked and ground.

Thus, it is apparent that there has been provided, in accordance with the invention, a bushingless workhead that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A workhead for holding a generally cylindrical object, comprising:
   a body having a longitudinal axis;
   a unitary collet mounted in the body concentrically with the longitudinal axis and including a first end having a first tapered portion and a second end having a second tapered portion opposing the first tapered portion, the unitary collet being configured to collapse about the object;
   a primary piston slidably disposed within the body and having a tapered surface configured for mating engagement with the first tapered portion; and
   a secondary piston slidably disposed within the body and having a tapered surface configured for mating engagement with the second tapered portion; wherein sufficient movement of at least one of the first or second pistons against the corresponding tapered portion will collapse the unitary collet against the object.

2. The workhead of claim 1, further comprising a retainer installed in the body, the retainer having a datum surface against which the collet is located at a predetermined location along the longitudinal axis.

3. The workhead of claim 2, wherein the collet includes:
   a plurality of longitudinally extending ribs having first and second ends terminating in the first and second collet ends, respectively, the ribs defining generally cylindrical external and internal surfaces; and
   a plurality of necks for flexibly joining alternate first and second ends of the ribs to each other.

4. The workhead of claim 3, wherein the first tapered portion has an external frusto-conical surface formed on the ribs at the first ends thereof and the second tapered portion has an external frusto-conical surface formed on the ribs at the second ends thereof, the apexes of the external frusto-conical surfaces pointing toward each other.

5. The workhead of claim 4, wherein the primary piston has a greater surface area exposed to the fluid chamber than the secondary piston.

6. The workhead of claim 5, wherein the primary and secondary pistons are generally annular and each includes a frusto-conical surface configured to matingly engage the corresponding external frusto-conical surfaces of the unitary collet.

7. The workhead of claim 1, wherein the primary and secondary pistons are annular and include a fluid chamber therebetween into which pressurized fluid is introduced to force the primary and secondary pistons in opposite directions and against the external frusto-conical surfaces to collapse the unitary collet.

8. The workhead of claim 2, wherein a fluid chamber is disposed intermediate the primary piston and the secondary piston, the primary piston having a larger surface area exposed to the fluid chamber than the secondary piston, the larger surface area enabling the primary piston to longitudinally move the unitary collet into contact with the datum surface when sufficient fluid is introduced into the fluid chamber.

9. The workhead of claim 8, further including springs engaging the primary piston and secondary piston to bias each piston away from the first and second tapered portions, respectively, of the unitary collet.

10. The workhead of claim 6 wherein a third frusto-conical surface is formed on the second end of the unitary collet with the apex thereof pointing away from the apex of the second tapered portion, the unitary collet being assemblable inside the primary and secondary pistons by pushing the third frusto-conical surface against the frusto-conical surface of the primary piston to sufficiently collapse the unitary collet while it is pressed into operable engagement with the primary and secondary pistons.

11. The workhead of claim 10, further comprising a drill collet having a plurality of longitudinally extending ribs concentric with the longitudinal axis and a flange extending partially around the external surfaces of the ribs proximate a plurality of first ends thereof.

12. The workhead of claim 11, wherein the retainer includes a locator cooperating with the first end of the unitary collet to removably capture the flange of the drill collet therebetween and to retain the drill collet inside the unitary collet.

* * * * *